United States Patent [19]

Andrae

[11] 4,157,884

[45] Jun. 12, 1979

[54] VACUUM MOLDER

[76] Inventor: Ralph N. Andrae, 4224 Rigby Rd., Crystal Lake, Ill. 60014

[21] Appl. No.: 820,906

[22] Filed: Aug. 1, 1977

[51] Int. Cl.$^2$ ............................................. B29C 17/04
[52] U.S. Cl. .................................... 425/173; 425/388
[58] Field of Search .............................. 425/173, 388

[56] References Cited

U.S. PATENT DOCUMENTS

| | | | |
|---|---|---|---|
| 3,072,964 | 1/1963 | Tilden | 425/388 |
| 3,190,945 | 6/1965 | Diamond | 425/388 X |
| 3,207,821 | 9/1965 | Jones-Hinton et al. | 425/388 X |
| 3,307,222 | 3/1967 | Baldwin et al. | 425/173 X |
| 3,841,819 | 10/1974 | Diamond | 425/388 |

OTHER PUBLICATIONS

Popular Mechanics, Dec. 1961, pp. 174–177.

*Primary Examiner*—Robert L. Spicer, Jr.
*Attorney, Agent, or Firm*—Lee & Smith

[57] ABSTRACT

A vacuum molding apparatus of simplified construction utilizing a vacuum cleaner as a vacuum source. The molding apparatus includes a tray with upstanding side walls having upper outturned flanges for mounting a pair of horizontally positioned holder frames which clamp a sheet of thermoplastic material therebetween directly above a highly reflective, bottom surface of the tray which upon being heated uniformly heats the plastic sheet mounted parallel thereabove.

The holder frames together with the sheet are manually transported and placed over a male mold pattern on a vacuum frame which comprises an air-tight box having a foraminous top plate through which air is drawn beneath the heated plastic sheet which is draped over the plate, and the mold pattern thus forming the sheet about the mold pattern. The box has a vacuum chamber co-extensive with the perforated top plate which is connected to one end of a vacuum hose.

11 Claims, 7 Drawing Figures

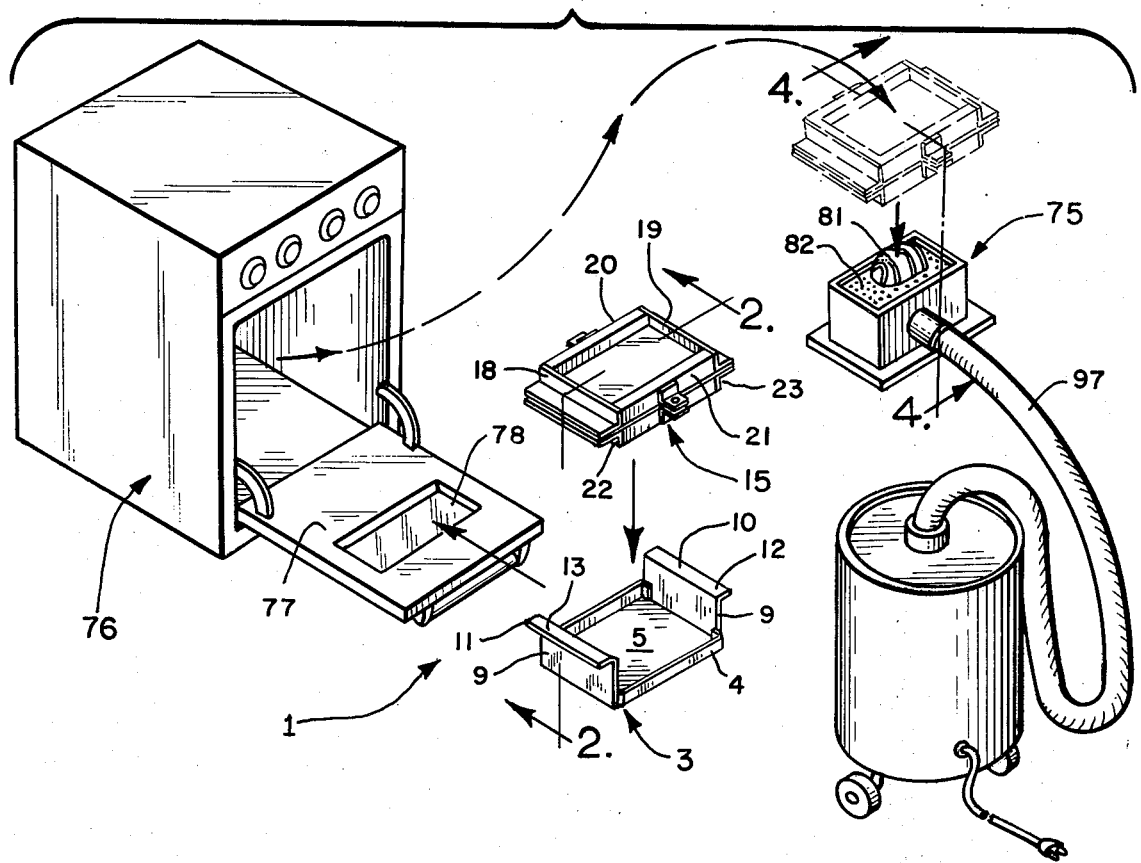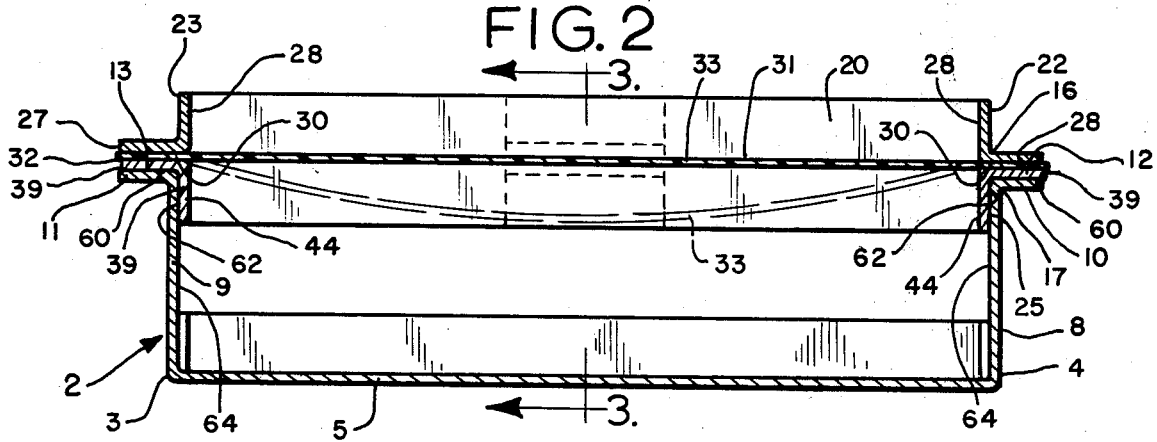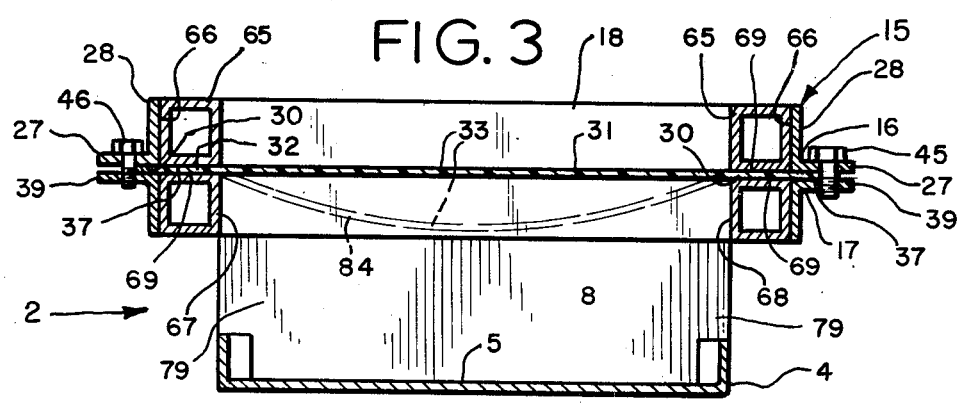

VACUUM MOLDER

SUMMARY OF THE INVENTION

Admittedly vacuum forming is an old art. It usually requires expensive apparatus or the expertise of an operator to obtain a satisfactory product. It has been my experience that the problem has been that the plastic sheet has been only locally heated so that it does not form properly and that the transport assembly has not been such as to permit quick transfer from the heater to the mold, if separated.

One of the difficulties encountered by the amateur molder is that he does not possess the necessary technical information to know when the sheet is heated sufficiently to be transferred to the mold assembly. If it is too hot it may deteriorate, burn or break while being transported from the heater to the mold, and if too cold it will not form properly.

The principal object of the invention is to provide a novel, simple and effective vacuum molding device.

A more specific object is to provide a novel molding apparatus which has a heater section comprising a novel heat reflecting tray which functions to more uniformly distribute the heat to the plastic supported thereabove.

A further object is to devise a novel holder frame for the plastic which not only fits the tray but which is quickly removable therefrom anw which fits about the vacuum box so that the heated sheet may be quickly located about the mold object.

It is a further primary object of this invention to provide a plastic heating device for sheet thermoplastic material, in which the sheet is supported horizontally peripherally within a frame atop a pan-shaped heater which has a bottom panel adapted to be placed upon a gas or electric burner or, the panel being located beneath and coextensive with the sheet.

The invention comprehends an arrangement wherein the frame thickness serves as a gauge for the operator that the plastic sheet is sufficiently heated, the indicia being the bottom of the belly of the drooping sheet which is coplanar with the bottom of the frame.

These and other objects and advantages inherent in and encompassed by the invention will become more readily apparent from the specification and the drawings, wherein:

FIG. 1 is an exploded view of the various components of the apparatus showing the parts in perspective and the routing of the components from heating to molding.

FIG. 2 is an enlarged cross-sectional view taken substantially on line 2—2 of FIG. 1 of the heater tray, holder clamps and plastic sheet preparatory to insertion into the oven.

FIG. 3 is a cross-section taken substantially on line 3—3 of FIG. 2;

DESCRIPTION OF THE INVENTION

Figure 4:
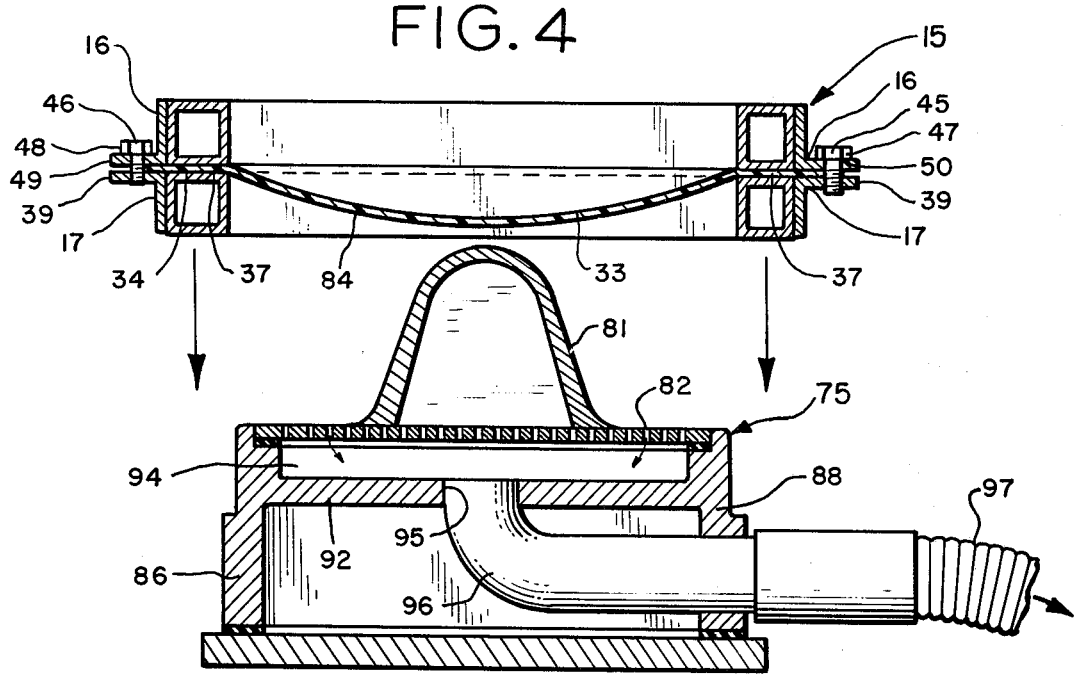
FIG. 4 is an enlarged cross-section taken substantially on line 4—4 of FIG. 1 of the holder frames and sheet in position to mount onto the vacuum box.

Having particular reference to the drawings, the apparatus generally designated 1 comprises a heater 2 including a bottom heater tray 3 of metal, preferably made of polished aluminum or steel preferably chrome or nickel plated.

The tray 3 has a generally rectangular pan-shaped bottom portion 4 including a bottom panel 5 and upstanding lateral side walls 6 and 7 and end walls 8 and 9. The end walls 8 and 9 are of greater height than the side walls, and at their upper end are provided with outturned horizontal mounting flanges 10 and 11, respectively which provide coplanar upper seats 12 and 13 for a clamping and transport frame assembly 15.

The frame assembly 15 is formed primarily from angle beams and comprises top or upper and bottom or lower frame members 16 and 17 of rectangular shape, the upper frame member having end beams 18,19 and side beams 20,21 and the lower frame member having end beams 22,23 and side beams 24,25. In fact, the two frame members are identical except that one is inverted with respect to the other in assembly, but for purposes of clarity in description they will be termed upper and lower and the various components assigned different reference numerals.

Each of the upper frame beams have a bottom outwardly directed horizontal flange 27 and an upright flange 28. The bottom flanges 27 provide coplanar bottom clamp faces 30 which seat against the top side 31 of the adjacent peripheral edge portion 32 of the sheet of plastic 33 positioned therebeneath; the bottom side 34 of the thermoplastic sheet 33 (such as polyethylene, polypropylene, etc.) seats at its peripheral edge portion 32 on the top coplanar faces 37 of the horizontal flanges 39 of the angle beams forming the bottom frame 17, each beam of the bottom frame having a vertical flange 44 which depends from the inner edge of the related flange 39.

As best seen in FIG. 3, the opposing side beams of the upper and lower frames are clamped together by bolts 45,46 which have their head 47,48 abutting the top sides 49,50 of respective flanges 27. The bolts have shank portions 51,52 passing through openings 53,54 in respective flanges 27, the lower ends of shanks 51,51 having thread at 54,55 and being threaded into threaded openings 57,58 in the opposing flanges 39 of the side beams of the bottom frame. This type of threaded bolt connection is shown inasmuch as it is least expensive. However, it will be understood that the invention envisions the use of various clamping devices, etc. and particularly those of the fast-clamp and release type which are well known.

Attention is directed to FIG. 2 wherein it will be observed the bottom sides 60 of the horizontal flanges 39 of the end beams of the bottom frame seat upon the respective upper seating faces 11 and 12 of the heater tray 3, and the depending flanges 44 of these end beams of the bottom frame have their external verticle sides 62 complementally fitted against the internal sides 64 of the respective upright end walls 8 and 9.

A feature of the upper and lower frames is the provision of box section beams 65,65 connected to the interior vertical sides 66,66 of the vertical flanges 28 of the side beams 20,21 of the upper frame. Similar box section beams 67,68 are connected to the interior vertical sides of the vertical flanges 44 of the side beams 42,43 of the lower frame. The box-section or tubular beams 65,65 and 67,68 provide on their lower and upper sides extensive surface areas 69 to provide support for the longer sides of the plastic sheet and also serve as heat sinks or thermal reservoirs and conductors to distribute the heat along the longer side edges of the sheet where it would first tend to cool when the frame assembly with the plastic sheet is being transferred off the heater tray onto the vacuum mold assembly generally designated 75.

It will of course be understood that after the frame assembly is clamped about the sheet and positioned as seen in FIGS. 2 and 3 on the tray, these components are all inserted into the oven identified at 76, in which after closing its door 77, the aforesaid components are heated to a predetermined temperature as required to soften the plastic, and if it is polyethylene or polypropylene is in the range of about 250° F.–350° F. The heat is applied until the plastic becomes supple. The operator can view the condition of the plastic through the oven window 78, under the frame assembly 15 into the tray through the viewing spaces 79,79 (FIG. 3) above the short longitudinal side walls of the tray; and if he perceives that the plastic has sagged to the level of the lower side of the frame assembly as shown in phantom lines in FIGS. 2 and 3, which serves as an indicia that the plastic is in condition for molding, the operator will remove the tray, frame and plastic composite and center the drape the soft plastic sheet over the form or mold pattern 81, which is preferably centered on the forominous top plate 82 of the vacuum mold 75.

Figure 5:
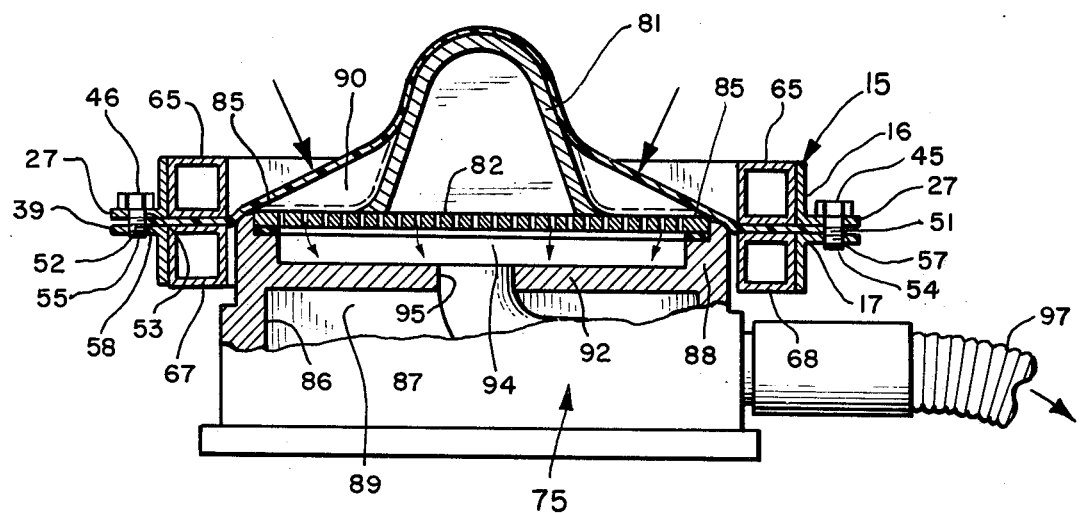
FIG. 5 is a view similar to FIG. 4 showing the components in assembled relation.
Figure 6:
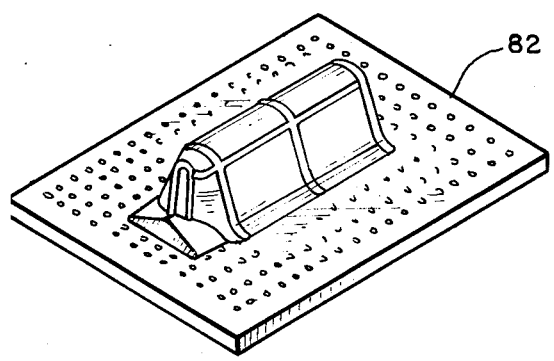
FIGS. 6 and 7 are perspective views of the vacuum plate with different mold patterns thereon.
Figure 7:
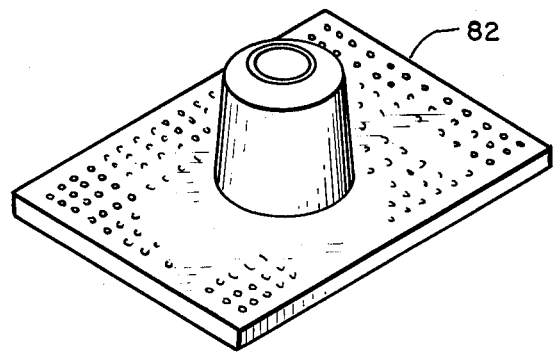

FIG. 4 shows the heated assembly 3 in a vertically aligned position preparatory to lowering as seen in FIG. 5, whereat the frame assembly 15 is loosely fitted about a complementally sized rectangular box 83 with the lower side 84 of the plastic sheet resting at 85 against the upper rounded coplanar edge of the upright side walls 86,87,88 and 89 of the vacuum box or plate 82 providing an adequate seal for the plastic to the box so that the air in the spaces 90 beneath the plastic and about the mold form is easily withdrawn or evacuated, thereby drawing the plastic about the form as it is sucked against the top of the plate 82.

The vacuum box has a horizontal partition wall 92 adjacent to its upper end integral or connected at its edges to the interior sides of the side walls of the box and forming therewith a vacuum chamber 94 which communicates through a central orifice 95 with a conduit 96 which is connected to a hose 97 connected to vacuum side of a vacuum cleaner 98.

It will be noted that a simple, inexpensive and effective molding apparatus has been provided in which the components are organized in a unique manner to properly and uniformly heat the plastic in a quick transportable frame which then can be positioned on the vacuum mold. The auxiliary side beams 64,65 and 67,68 serve in multiple capacity not only to provide extensive clamping surface, but also to retain sufficient heat during transfer from oven to mold to insure that the plastic will not cool in the extended areas. Furthermore the tray and frame assembly provide correlated effective heat reflection to the plastic and the tray structure's short longitudinal walls on the tray obtains a window means 79 for readily gauging the condition of the plastic, in that as the sheet starts to belly below the lower side of the frame assembly, this provides the indicia that the plastic is in condition so that it can be molded.

It will be appreciated that in view of the foregoing disclosure, various other embodiments will now become apparent to those skilled in the art which will fall within the scope of the hereto appended claims:

I claim:

1. In a vacuum molding apparatus, a transportation and heat retention unit for heating and maintaining heated sheets for thermoplastic material comprising a tray having a bottom heat-reflective panel and mounting means thereabove, and releasable means for mounting a sheet of thermoplastic on said mounting means above said bottom in vertically spaced relation thereto in a position to be radiantly heated thereby, maintaining said thermoplastic sheet, when heated and removed from the source of heat, in a supple state until said sheet is removed from said tray.

2. The invention according to claim 1 and said tray comprising a pan-like structure including said bottom and a pair of walls at the lateral edges of said panel having upper terminal ends, and said mounting means disposed on said ends and providing support means for said sheet-mounting means, and said sheet-mounting means comprising means for clamping the peripheral edges of the sheet therebetween and disposable on said support means in position aligning the sheet vertically with respect to said heat reflective panel.

3. The invention according to claim 2 and said tray being generally rectangular and said walls disposed at opposite ends of the panel and a second pair of walls of limited vertical extent terminating in upper edges spaced substantially below said sheet mounting means and providing viewing windows for visual observation of draping of the sheet as it is being heated.

4. The invention according to claim 1 and said sheet mounting means being a rectangular frame assembly clamping the periphery of said sheet of material, and heat-retaining means mounted on the frame along the longitudinal edge portions of the sheet for maintaining the sheet in supple conditions throughout its length for subsequent operations.

5. The invention according to claim 4 and said frame assembly comprising upper and lower frames and means releasably clamping said frames against opposite marginal edge portions of the sheet of material positioned therebetween.

6. The invention according to claim 2 and said frames comprising angle beams and forming upper and lower frame members, said lower member angle beams oriented with one of the flanges of each beam being disposed horizontally and the other vertically, the horizontal flanges being coplanar and seating upon said support means and the vertical flanges having slidable seating contact with the vertical sides of respective walls.

7. The invention according to claim 5 and said heat-retaining means comprising metal beams within the frame.

8. The invention according to claim 7 and said beams being box-section and having areas coplanar with the plastic-engaging areas and providing extensive bearings for the sheet.

9. The invention according to claim 8 and a vacuum mold shaped complemental to said frame and having a forominous upper plate and a mold member thereon, the frame-mounted heated plastic being adapted to be placed over the plate and mold and be drawn thereagainst by force of vacuum applied to the underside of the plate.

10. The invention according to claim 9 and said mold comprising a vacuum chamber beneath the plate, and said source of vacuum comprising a vacuum cleaner having a hose attached to the chamber.

11. In a vacuum molding apparatus having a heating unit into which a sheet of thermoplastic material is inserted for heating the sheet to a supple state, and a molding unit separate from the heating unit for shaping the supple sheet into a predetermined form, the improvement comprising a transportation and heat retention unit for aiding the heating of the sheet while inserted within said heating unit and maintaining the sheet in a supple state when the sheet is removed from the heating unit, said transportation and heat retention unit having a heat-reflective panel means positioned to aid in heating of said sheet while said sheet is located in said heating unit and radiantly heat said sheet when removed from said heating unit, said panel being removable from communication with said sheet when said sheet is formed in the molding unit.

* * * * *